Figure 1:
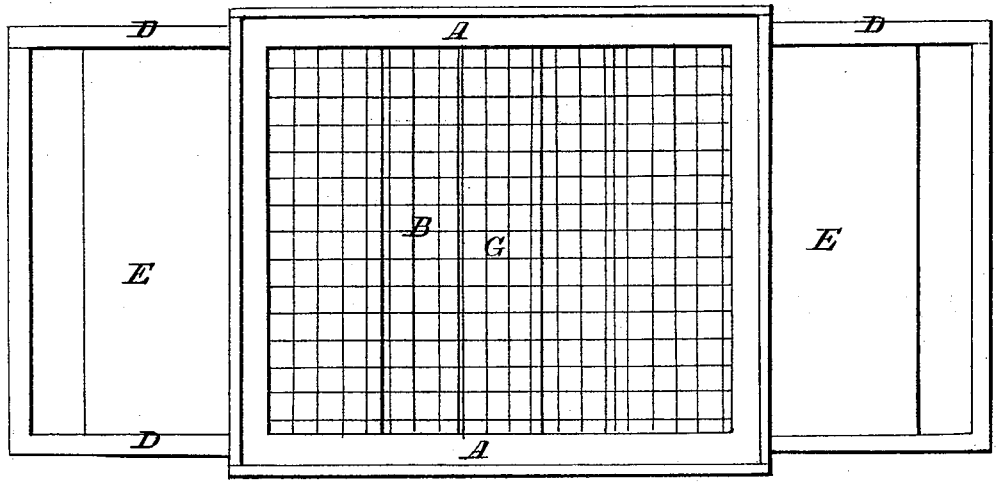

W. A. BEMIS.
Cheese-Curd Cutter.

No. 68,279.  Patented Aug. 27, 1867.

Witnesses
J. Lehmann
Leo A. Ellis

Inventor.
Wm. A Bemis
Per
T. H. Alexander & Co.
Attys.

United States Patent Office.

WILLIAM A. BEMIS, OF SPENCER, MASSACHUSETTS.

*Letters Patent No. 68,279, dated August 27, 1867.*

IMPROVEMENT IN CHEESE-CURD CUTTERS.

*The Schedule referred to in these Letters Patent and making part of the same.*

TO ALL WHOM IT MAY CONCERN:

Be it known that I, WILLIAM A. BEMIS, of Spencer, State of Massachusetts, have invented certain new and useful improvements in Curd-Cutters; and I declare the following to be a full, clear, and exact description of the same, reference being had to the accompanying drawings and to the letters of reference marked thereon.

Figure 1 is a plan view of my invention.

Letter A represents the box into which the curd is placed preparatory to being cut. This box may be of any desired size, and should be provided with a cover that will play freely up and down in the box. Across the bottom of this box A there is placed a number of wires or knives for the purpose of dividing or cutting the curd. These wires can be arranged so as to be moved nearer to or farther from each other, as may be desired, or they may be made stationary. Letter D represents a sliding-frame, which moves backward and foward in a groove made in the box A, immediately under the wires or knives B. In the centre of this sliding-frame D there is placed a double-edged knife, G, in such a manner as to extend across the bottom of the box A for the purpose of cutting the curd into very small, thin pieces after it has been passed through the wires or knives B. This slide D is also provided with a board, E E, on each side of the knife G, so as to catch the curd as it falls from the box.

The *modus operandi* is as follows: The box is filled with curd; it is then pressed downwards upon the wires by means of a cover or weight; the slide D is moved backward and forward, the double-edge knife cutting it into small pieces, which fall upon the boards E E. This process is repeated until the curd is cut fine enough, when it is ready to be made into cheese.

Having thus fully described my invention, what I claim and desire to secure by Letters Patent, is—

1. The employment of the double-edged knife G, in combination with the sliding-frame D, as and for the purpose set forth.

2. The employment of the boards E E, in combination with the frame D and knife G, all arranged to operate in connection with box A, as and for the purpose specified.

WILLIAM A. BEMIS.

Witnesses.
 JOHN N. GROUT.
 ALLSTON E. GROUT.